United States Patent [19]
Itoh

[11] Patent Number: 4,594,670
[45] Date of Patent: Jun. 10, 1986

[54] ROBOT CONTROL APPARATUS

[75] Inventor: Atsushi Itoh, Aichi, Japan

[73] Assignee: Mitsubishi Denki Kabushiki Kaisha, Tokyo, Japan

[21] Appl. No.: 581,621

[22] Filed: Feb. 21, 1984

[30] Foreign Application Priority Data

Feb. 21, 1983 [JP] Japan .................................. 58-27266

[51] Int. Cl.⁴ .............................................. G05B 19/42
[52] U.S. Cl. .................... 364/513; 318/568;
318/632; 364/170; 364/183; 901/2; 901/9; 901/15
[58] Field of Search ........................ 364/513, 191–193,
364/571, 478, 474, 475, 167–171, 183; 901/2–6,
9; 318/568, 632; 414/730

[56] References Cited

U.S. PATENT DOCUMENTS

| 4,011,437 | 3/1977 | Hohn | 364/192 |
| 4,140,953 | 2/1979 | Dunne | 901/5 X |
| 4,356,554 | 10/1982 | Susnjara et al. | 364/513 |
| 4,362,977 | 12/1982 | Evans et al. | 901/3 X |
| 4,481,592 | 11/1984 | Jacobs et al. | 364/513 |

FOREIGN PATENT DOCUMENTS

| 0094214 | 11/1983 | European Pat. Off. |
| 2012858 | 9/1970 | Fed. Rep. of Germany |
| 2709335 | 9/1977 | Fed. Rep. of Germany |
| 3210675 | 10/1982 | Fed. Rep. of Germany |
| 3236127 | 5/1983 | Fed. Rep. of Germany |

Primary Examiner—Joseph Ruggiero
Attorney, Agent, or Firm—Sughrue, Mion, Zinn, Macpeak, and Seas

[57] ABSTRACT

An apparatus for controlling a robot having multi-articulation-type arms with a high accuracy. Work point data and work point instructions for the robot are stored in a main storage section, while data representing the present position of an operating end of the arm of the robot is stored in a present point storage section. Reference position data is stored in a reference point storage section. A central processing unit produces a signal for instructing the robot to effect predetermined operations on the basis of the work point data, the work procedure instructions, the present position data, and the reference point data. A correction section determines a deviation of the operating end of the robot from positional data corresponding to the present position and corrects the stored positional data on the basis of the determined deviation.

11 Claims, 9 Drawing Figures

ROBOT CONTROL APPARATUS

BACKGROUND OF THE INVENTION

The present invention relates to a robot control apparatus, and more particularly to a robot control apparatus in which the actual spatial position of an operating member is made to be completely coincident with the stored data representing the position.

FIGS. 1A and 1B are schematic diagrams showing a robot of the two-arm horizontal articulation type, viewed from above, as an example to which the present invention is applied. In FIGS. 1A and 1B, reference numeral 1 designates a first arm which rotates about a first shaft (or pin) 3 provided at one end of the first arm 1, and 2 designates a second arm which rotates about a second shaft 4 rotatably provided at the other end of the first arm 1. By rotating the first and second arms 1 and 2 through predetermined angles, the other end of the second arm 2 can be brought into a predetermined desired operating position. Further, reference numeral 5 designates a position confirmation switch mechanically fixed to the first shaft 3 and used for establishing a reference point of the first arm 1, 6 designates a dog attached to the first arm 1 on the side of the first shaft 3 and on the center line of the first arm 1 corresponding to the position confirmation switch 5, 7 designates a position confirmation switch mechanically fixed to the first arm 1 at its end on the side of the second arm 2 for establishing a reference point of the second arm 2, and 8 designates a dog attached to the second arm 2 on the side of the first arm 1 and on the center line of the second arm 2 corresponding to the position confirmation switch 7. Thus, the pair of the position confirmation switch 5 and the dog 6 are disposed opposite one another on the center line of the first arm 1, and the pair of the position confirmation switch 7 and the dog 8 are disposed opposite one another on the center line of the first arm 2. FIG. 1B shows the state of the robot in which the respective arms 1 and 2 are returned to their reference points.

The operation of a robot 9 having such an arrangement as described above is controlled by a control device 10 as shown in FIG. 2. In FIG. 2, reference numeral 11 designates a main storage section for storing the data of work points, the work procedure, etc., of the robot, 13 designates a reference point storage section for storing the positional data of the respective arms 1 and 2 when they are returned to their reference points, 14 is a central processing unit (CPU) for effecting various control routines such as positional control for the robot 9 and control of external apparatuses, and 15 designates an instruction output section for providing an output to a servomotor of the robot 9. On the basis of the work point data and the work procedure stored in the main storage section 11, the present position data stored in the present point storage section 12, and the reference position data stored in the reference point storage section 13, the CPU 14 computes and sends instructions to the robot 9 through the instruction output section 15 so as to cause the robot 9 to perform predetermined desired movements. The positional data stored in the present point storage section 12 and the reference point storage section 13 includes, for example, as shown in FIG. 3, data representing the angle $\theta_1$ between the X axis of a reference orthogonal coordinate system and the first arm 1 (more specifically, the center line of the first arm 1) and the angle $\theta_2$ between an extension line (broken line) of the first arm 1 and the second arm 2.

In the thus arranged conventional robot control device, when the operational control is initiated (power-on time), it is necessary to confirm the positions of the arms 1 and 2 and store them in the present point storage section 12 because the content of the present point storage section 12 is then in a blank state. For this, in starting, reference point return is effected whereby the actual spatial positions of the respective arms 1 and 2 are caused to agree with the stored data of the respective arms 1 and 2. For example, if the arms 1 and 2 are in the position shown in FIG. 1A, the arm 1 is rotated about the shaft 3 until the position confirmation switch 5 aligns with the dog 6, and at the same time the arm 2 is rotated about the shaft 4 until the position confirmation switch 7 aligns with the dog 8, thereby bringing the arms 1 and 2 to their reference points as shown in FIG. 1B.

Upon the confirmation of alignment between the pair of the position confirmation switch 5 and the dog 6 and between the pair of the position confirmation switch 7 and the dog 8, the respective arms 1 and 2 are in their reference point returned states as shown in FIG. 1B. Upon the detection of alignment between the pair of the position confirmation switch 5 and the dog 6 and between the pair of the position confirmation switch 7 and the dog 8, the CPU 14 transfers the positional data $\theta_{10}$ and $\theta_{20}$ stored in the reference point storage section 13 to the present point storage section 12, and the actual spatial positions of the respective arms 1 and 2 are then made coincident with the stored positional data. Since the position confirmation switches 5 and 7 and the dogs 6 and 8 are mechanically fixed, the positions of the respective arms 1 and 2 do not vary when they are returned to their reference points. Thereafter, positional control of the robot is performed on the basis of the positional data stored in the present point storage section 12 and in accordance with the work procedure stored in the main storage section 11. That is, when the tip (free) end of the composite robot arm is to be moved to a predetermined work point according to the procedure stored in the main storage section 11, the amount of movement of each of the arms 1 and 2 is computed by the CPU 14 such that the present position data, which is stored in the present point storage section 12 and which is successively updated in accordance with the movement, agrees with the positional data of the predetermined work point.

For positional control of robot to be performed in the manner as described above, initial agreement between the actual spatial positions of the reference points of the arms 1 and 2 and the stored positional data of the reference points is a prerequisite. It is difficult, however, to attach the position confirmation switches and the dogs at the positions of their reference points with a high accuracy, even if the positions of their reference points are accurately determined in the design stage, because of errors in assembly and/or manufacturing tolerances. In the case where disagreement between such positions exists, that is when the actual spatial positions $\theta_{11}$ and $\theta_{21}$ (FIG. 4, solid line) do not agree with the positional data $\theta_{12}$ and $\theta_{22}$ (FIG. 4, broken line) stored in the reference point storage section 13, in order to move the tip end of the robot in the positive direction of the Y axis and parallel to the Y axis, the CPU 14 carries out its computations on the basis of the stored date $\theta_{12}$ and $\theta_{22}$, thereby causing the instruction output section 15 to produce an instruction which causes the tip end of the robot arm to pass through the linear path between the points a and b as shown by the double-dot chain line in FIG. 4. Practically, however, there is a problem in that the tip end of the robot arm passes along a locus from the point A to the point B as shown by single-dot chain line in FIG. 4 because the actual operational start point A is at the position determined by the data values $\theta_{11}$ and $\theta_{21}$, and thus it is impossible to carry out the desired work accurately.

The reason why the locus becomes a curve will now be described. When a certain point P (X,Y) in a plane is instructed as a position of the tip end of the robot arm as shown in FIG. 5, there exists the following relations among the values X, Y, $\theta_1$ and $\theta_2$:

$$X = l_1\cos\theta_1 + l_2\cos(\theta_1 + \theta_2), \text{ and} \quad (1)$$
$$Y = l_1\sin\theta_1 + l_2\sin(\theta_1 + \theta_2).$$

The values $\theta_1$ and $\theta_2$ can be obtained from the equation (1) as follows:

$$\theta_2 = \begin{cases} 180° - \cos^{-1}\left[\frac{l_1^2 + l_2^2 - X^2 - Y^2}{2l_1 \cdot l_2}\right] \\ \text{(right hand system hand }(+\theta_2)\text{)} \\ \cos^{-1}\left[\frac{l_1^2 + l_2^2 - X^2 - Y^2}{2l_1 \cdot l_2}\right] - 180° \\ \text{(left hand system hand }(-\theta_2)\text{)} \end{cases} \quad (2)$$

$$\theta_1 = \tan^{-1}\left[\frac{Y(l_1 + l_2\cos\theta_2) - Xl_2\sin\theta_2}{X(l_1 + l_2\cos\theta_2) + Yl_2\sin\theta_2}\right] . \quad (3)$$

Although there are two solutions for the value of $\theta_2$, that is, one for both the right-and left-hand systems, the following description relates only to the right-hand system ($+\theta_2$). The case of the left-hand system is similar to the right-hand one.

Assume now that the value of point $(X_0,Y_0)$ is instructed, and the angles of the respective articulations are expressed from equations (2) and (3) as follows:

$$\theta_{20} = 180° - \cos^{-1}\left[\frac{l_1^2 + l_2^2 - X_0^2 - Y_0^2}{2l_1 \cdot l_2}\right], \text{ and}$$

$$\theta_{10} = \tan^{-1}\left[\frac{Y_0(l_1 + l_2\cos\theta_{20}) - X_0l_2\sin\theta_{20}}{X_0(l_1 + l_2\cos\theta_{20}) + Y_0l_2\sin\theta_{20}}\right] .$$

Similarly to this, the angles of the respective articulations when a point $(X_0+\Delta X, Y_0+\Delta Y)$, shifted by $(\Delta X, \Delta Y)$ from the point $(X_0,Y_0)$, is instructed are obtained as follows:

$$\theta_{21} = 180° - \cos^{-1}\left[\frac{l_1^2 + l_2^2 - (X_0 + \Delta X)^2 + (Y_0 + \Delta Y)^2}{2l_1 \cdot l_2}\right],$$

and $$\theta_{11} = \tan^{-1}\left[\frac{(Y_0 + Y)(l_1 + l_2\cos\theta_{21}) - (X_0 + \Delta X)l_2\sin\theta_{21}}{(X_0 + X)(l_1 + l_2\cos\theta_{21}) + (Y_0 + \Delta Y)l_2\sin\theta_{21}}\right] .$$

Similarly, when a point $(X_0+2\cdot\Delta X, Y_0+2\cdot\Delta Y)$ is instructed, $$\theta_{22} = 180° - \cos^{-1}\left[\frac{l_1^2 + l_2^2 - (X_0 + 2\Delta X)^2 + (Y_0 + 2\Delta Y)^2}{2l_1 \cdot l_2}\right],$$

and $$\theta_{12} = \tan^{-1}\left[\frac{(Y_0 + 2\Delta Y)(l_1 + l_2\cos\theta_{21}) - (X_0 + 2\Delta X)l_2\sin\theta_{22}}{(X_0 + 2\Delta X)(l_1 + l_2\cos\theta_{21}) + (Y_0 + 2\Delta Y)l_2\sin\theta_{22}}\right] .$$

The tip end of the robot arm will pass through these three points if the robot is an ideal one. Practically, however, as explained above, a real robot will have some deviation between the actual position and the stored point. This deviation is a difference between the position of the reference point of each articulation and the value of the coordinates of the reference point of the robot arm expressed by $\Delta\theta_1$, and $\Delta\theta_2$. Accordingly, for desired values (positions) $(\theta_{10}, \theta_{20})$, $(\theta_{11}, \theta_{21})$ and $(\theta_{21}, \theta_{22})$, obtained as results of computing, the actual position is found from equation (1) to be:

$$\begin{cases} X_0 = l_1\cos(\theta_{10} + \Delta\theta_1) + l_2\cos(\theta_{10} + \Delta\theta_1 + \theta_{20} + \Delta\theta_2) \\ Y_0 = l_1\sin(\theta_{10} + \Delta\theta_1) + l_2\sin(\theta_{10} + \Delta\theta_1 + \theta_{20} + \Delta\theta_2) \end{cases}$$

$$\begin{cases} X_0 + \Delta X = l_1\cos(\theta_{11} + \Delta\theta_1) + l_2\cos(\theta_{11} + \Delta\theta_1 + \theta_{21} + \Delta\theta_2) \\ Y_0 + \Delta Y = l_1\sin(\theta_{11} + \Delta\theta_1) + l_2\sin(\theta_{11} + \Delta\theta_1 + \theta_{21} + \Delta\theta_2) \end{cases}$$

$$\begin{cases} X_0 + 2\cdot\Delta X = l_1\cos(\theta_{12} + \Delta\theta_1) + l_2\cos(\theta_{12} + \Delta\theta_1 + \theta_{22} + \Delta\theta_2) \\ Y_0 + 2\cdot\Delta Y = l_1\sin(\theta_{12} + \Delta\theta_1) + l_2\sin(\theta_{12} + \Delta\theta_1 + \theta_{22} + \Delta\theta_2) \end{cases}$$

If $\Delta\theta_1=0$ and $\Delta\theta_2=0$, the robot is ideal and the robot arm will pass through the three points $(X_0,Y_0)$, $(X_0+\Delta X, Y_0+\Delta Y)$ and $(X_0+2\Delta X,Y_0+2\Delta Y)$. However, when $\Delta\theta_1 \neq 0$ and $\Delta\theta_2 \neq 0$, components due to the values $\Delta\theta_1$ and $\Delta\theta_2$ are added, and therefore the three points are shifted from the desired locus. Thus, the locus becomes the curve AB. In order to eliminate this error, it has been the practice to make the data points coincident by actually measuring the distance of actual movement of the robot by using an expensive jig, for example, such as a digitizer, for focusing agreement between the spatial position of the reference point and the stored positional data of the reference point.

SUMMARY OF THE INVENTION

The present invention has been attained to eliminate the disadvantages of the prior art.

One object of the inventin is to provide a robot control apparatus in which the position control can be accurately performed.

Another object of the present invention is to provide a robot control apparatus in which work can be achieved accurately.

According to one aspect of the present invention, an apparatus for controlling a robot is provided having a main storage section for storing the work point and work procedure of the robot arm, a present point storage section for storing the data corresponding to the present position of the end of the robot arm, a reference point storage section for storing data indicative of the position of the end of the robot arm when the robot is actuated, and a central processing unit for causing the robot to achieve predetermined operations on the basis of the work point, the work procedure, the data indicative of the present position, and the reference position data, wherein the improvement relates to the provision of a correction section in which the deviation of the actual spatial position of the end of the robot arm from the stored data corresponding to the position in question is detected, and the stored data is corrected on the basis of the deviation.

DESCRIPTION OF THE PREFERRED EMBODIMENT

Figure 1A:
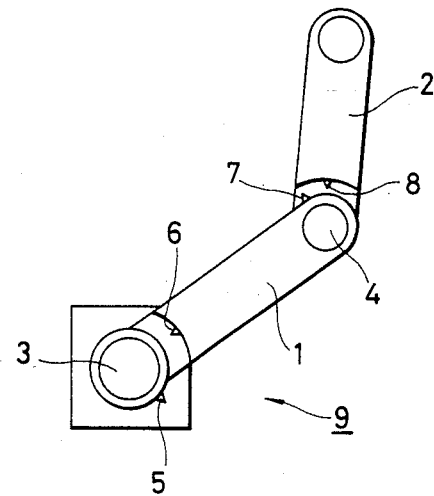
FIG. 1A is a diagram showing the outline of one position of a robot arm to which the present invention can be applied.
Figure 1B:
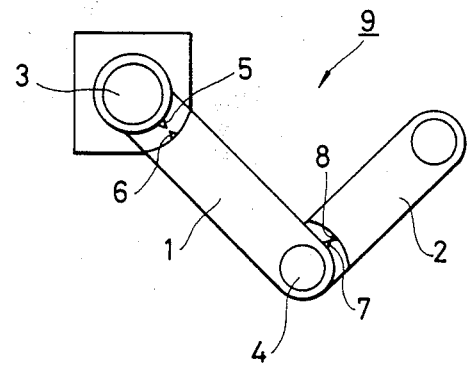
FIG. 1B is a diagram showing the outline of a reference position of a robot arm.
Figure 2:
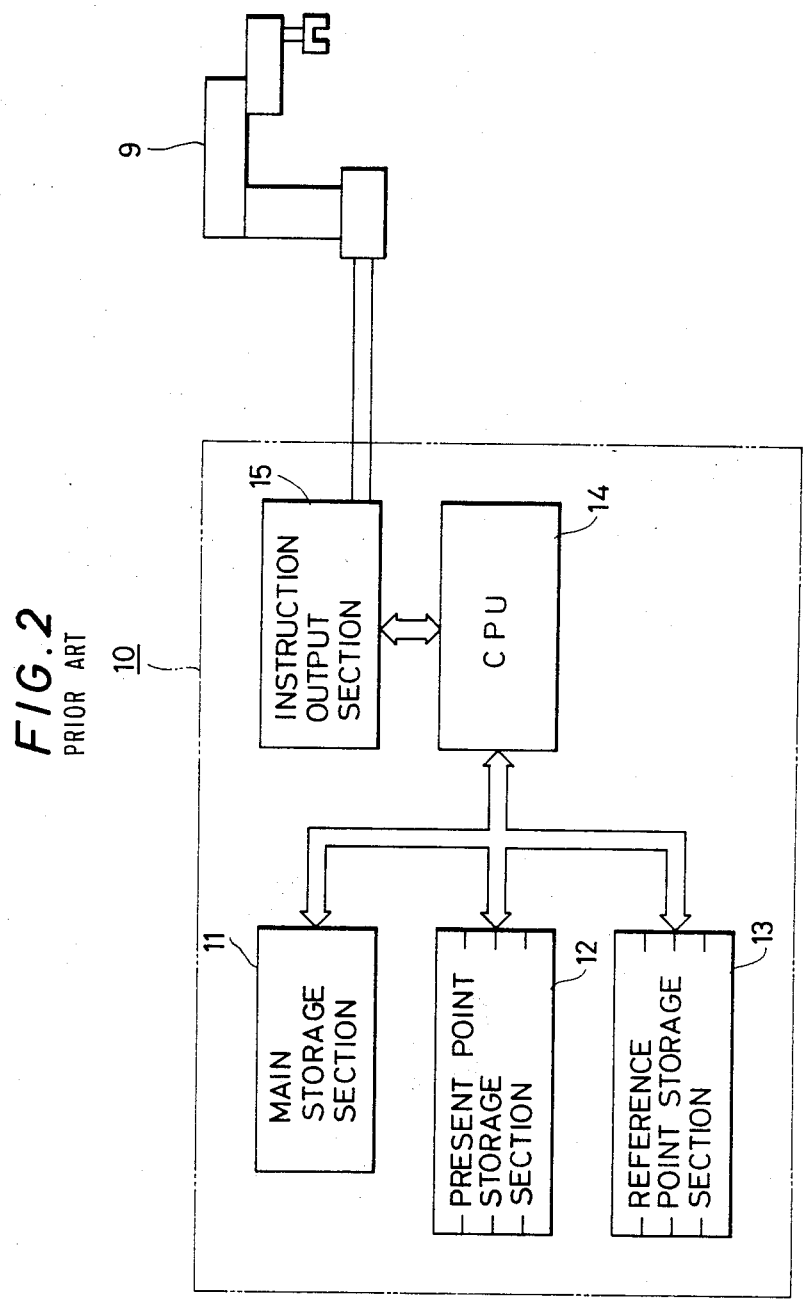
FIG. 2 is a block diagram showing the arrangement of a conventional robot control apparatus.
Figure 3:
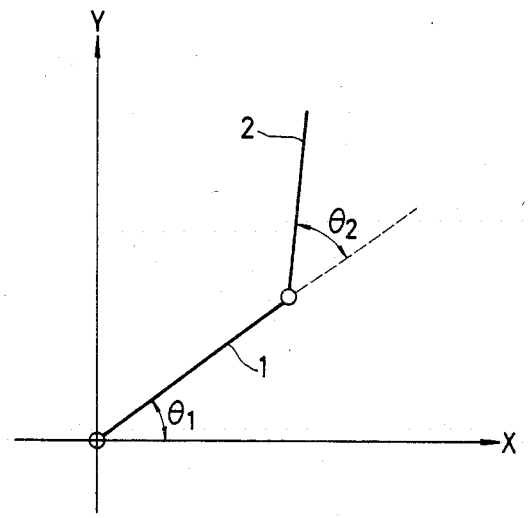
FIG. 3 is an explanatory diagram showing the position of the end of the robot arm.
Figure 4:
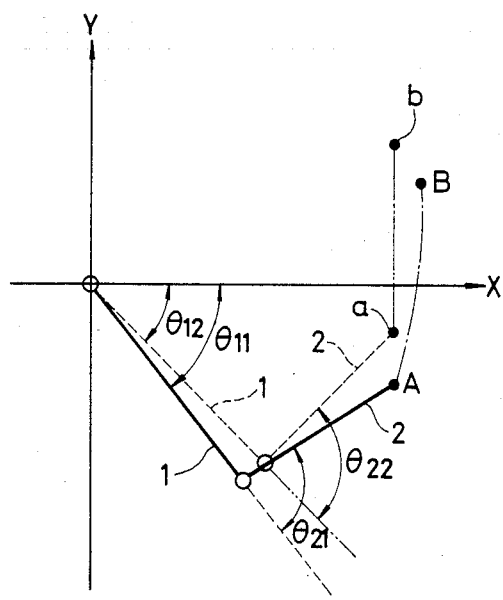
FIG. 4 is a diagram used for explaining deviations in position control in the conventional robot.
Figure 5:
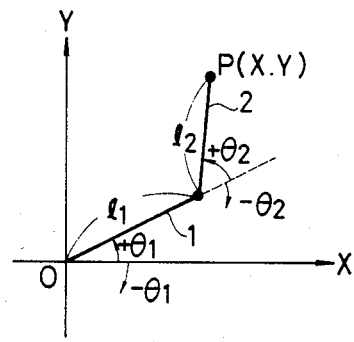
FIG. 5 is a diagram used for explaining the reason why a locus becomes the curve AB due to a defect indicated in FIG. 4.
Figure 6:
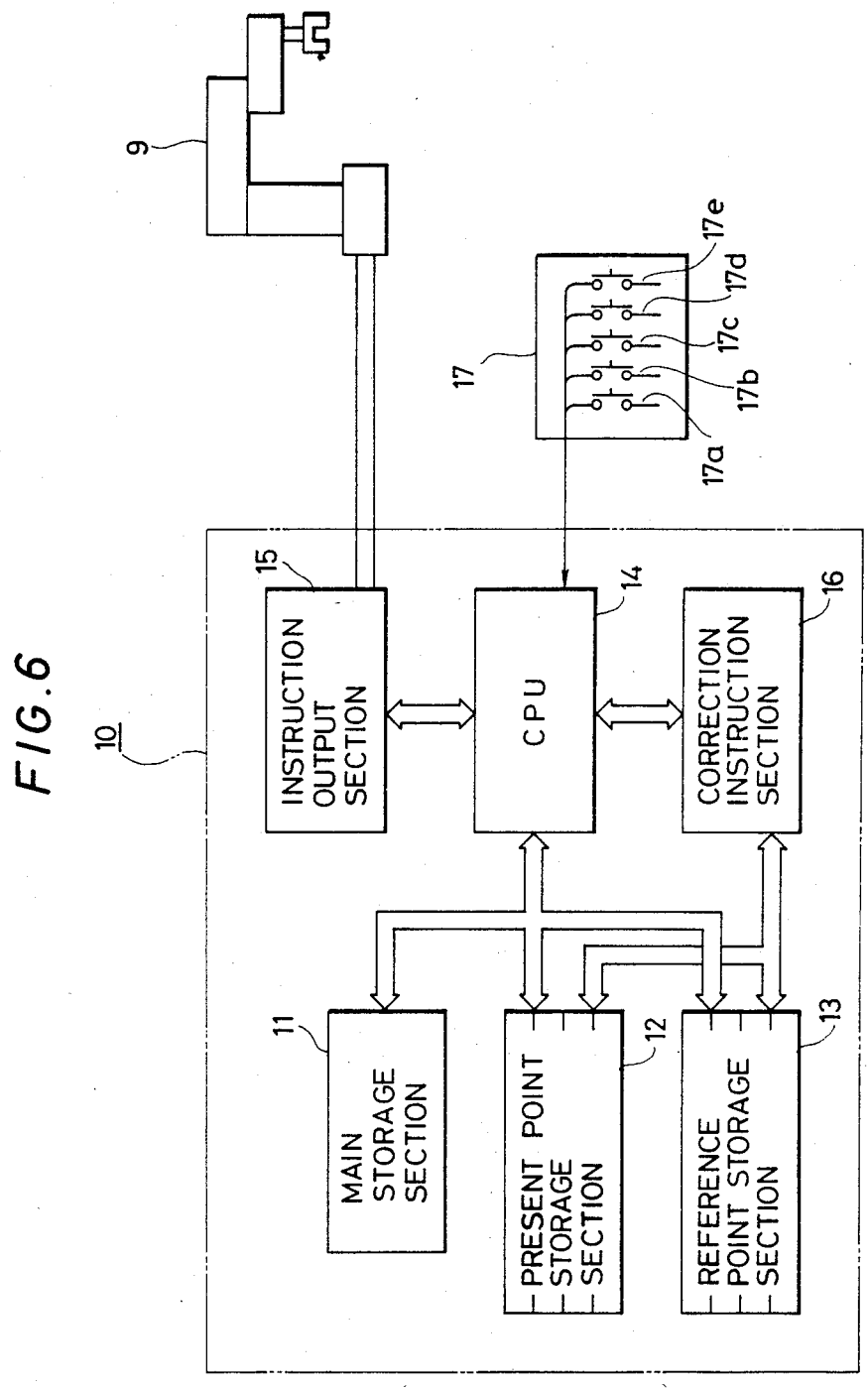
FIG. 6 is a block diagram showing the arrangement of a robot control apparatus constructed according to a preferred embodiment of the present invention.
Figure 7:
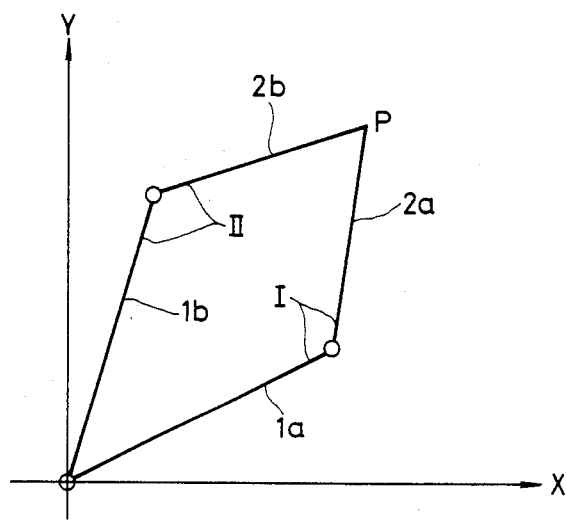
FIG. 7 is an explanatory diagram showing the attitude of a plurality of robot arms in which the position of the end of the robot arm is made to agree with a predetermined position.

A preferred embodiment of the present invention will be described hereunder with reference to FIG. 6, in which like reference numerals indicate the same or equivalent parts in FIG. 2. In FIG. 6, reference numeral 16 designates a correction instruction section for correcting, for example, the contents of a reference point storage section 13 on the basis of the deviation of the actual spatial position of the reference point from the positional data stored in a reference point storage section 13. Reference numeral 17 designates a correction teaching box constituted by various switches 17a through 17e which are operated to instruct a correction procedure. A CPU 14 in FIG. 6 computes the above-mentioned deviation in response to the positional data of the two kinds of attitudes of arms 1 and 2 as shown in FIG. 7, that is an attitude I(hereinafter referred to as the attitude in the right-hand system) of the arms 1a and 2a, and an attitude II(hereinafter referred to as the attitude in the left-hand system) of the arms 1b and 2b. The switches 17a through 17e on the teaching box 17 are turned on in a predetermined order to cause the CPU 14 to start the correction operation to detect the above-mentioned deviation, whereupon the correction instruction section 16 corrects the contents of the present point storage section 12 and/or the reference point storage section 13 on the basis of the detected deviation. That is, the CPU 14, the correction instruction section 16 and the teaching box 17 constitute a position data correction section.

A correction operation will now be described in detail. Upon the energization of the control device 10, it is necessary to perform a return-to-reference-point movement to bring the robot 9 into the state from which positional control can be commenced. However, there may occur a case where the actual spatial position of each of the arms 1 and 2 does not agree with the stored present positional data, even if the return-to-reference-point movement has been performed. In such a case, the operator pushes the correction start switch 17a to first bring the CPU 14 into the stand-by state, and then pushes the JOG switch 17b to supply a JOG instruction to the CPU 14 to cause the CPU 14 to supply a signal to the robot 9 through an output section 15 to move the arms 1 and 2 to bring the tip of the robot arm into alignment with a desired position P in accordance with the right-hand system attitude I. The term "JOG" corresponds to manual operation of the robot in which an open/close operation or an up/down movement of the hand attached at the end of the arm of the robot is achieved and the respective positional information is stored in the main storage section in the control device by manually operated switches.

Next, the record addition switch 17c is turned on to cause the CPU 14 to input the positional data $\theta_{1a}$ and $\theta_{2a}$ stored in the present point storage section 12. Following this, the JOG switch 17b is turned on again to move the arms 1 and 2 of the robot 9 so as to bring the tip end of the robot arm into alignment with the position P in accordance with the left-hand attitude II. Upon the completion of this operation, the record correction switch 17d is turned on to cause the CPU 14 to input the stored position data $\theta_{1b}$ and $\theta_{2b}$ with respect to the attitude II from the present point storage section 12. Finally, the record end switch 17e is turned on to cause the CPU 14 to compute the deviation of the actual spatial position from the stored position data on the basis of the values $\theta_{1a}$, $\theta_{2a}$, $\theta_{1b}$ and $\theta_{2b}$, whereupon the CPU 14 corrects the contents of the present point storage section 12 and/or the reference point storage section 13.

The correction is performed upon the completion of assembly of the robot. Thereafter, the work point is taught. Thus, the positional data has been completely corrected, and positional control can be accurately performed thereafter so that the robot 9 can carry out its movements along the designated path.

Figure 8:
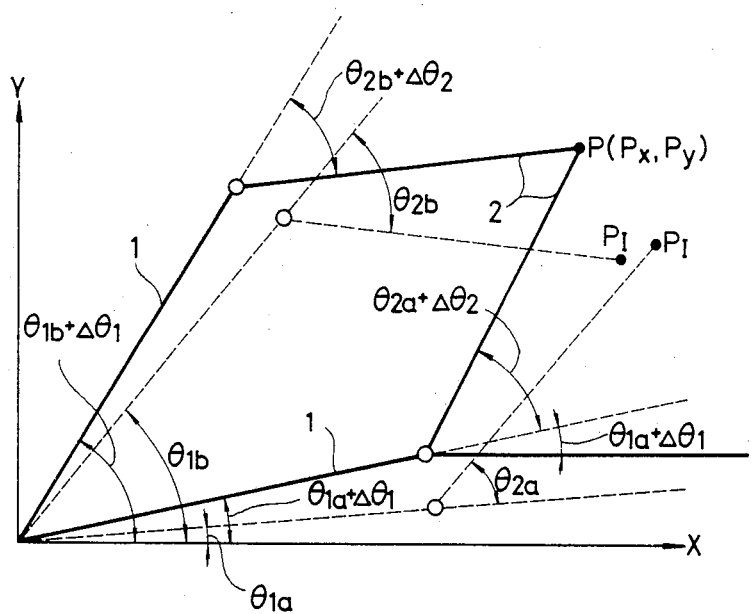
FIG. 8 is a diagram used for explaining the principles of deviation computing.

Referring to FIG. 8, a description will now be given regarding $\theta_{1a}$ and $\theta_{2a}$ corresponding to the present point in the right-hand system attitude I and the stored positional data on the basis of the stored positional data values $\theta_{1b}$ and $\theta_{2b}$ corresponding to the present point in the left-hand system attitude II.

In FIG. 8, P designates the above-mentioned desired position, and $P_I$ and $P_{II}$ designate points indicated by positional data stored when the point P is assumed as a fixed point in accordance with the right-hand system attitude I and the left-hand system attitude II respectively. The point $P_I$ is specified by the stored positional data values $\theta_{1a}$ and $\theta_{2a}$, and the point $P_{II}$ is specified by the stored positional data values $\theta_{1b}$ and $\theta_{2b}$, each of these positional data values differing from the absolute positional data of the fixed point P by $\Delta\theta_1$ with respect to the first arm 1 and by $\Delta\theta_2$ with respect to the second arm 2. That is, as indicated in FIG. 8, the values of the positions of the first and second shafts stored in the present point storage section when a given point $P(P_x,P_y)$ is indicated by the right- and left-hand systems are $\theta_{1a}$, $\theta_{2a}$ and $\theta_{1b}$, $\theta_{2b}$, respectively. The attitude of the robot arm, as shown by the broken line in FIG. 8, is obtained by the above-mentioned values. (In FIG. 8, the X-and Y-axis origins are assumed to be true references.) The attitude shown by the solid line in FIG. 8 can be obtained by converging the two points $P_I$ and $P_{II}$ into the single point P by adding the correction values $\Delta\theta_1$ and $\Delta\theta_2$ to the positional data values of the first and second shafts, respectively.

Viewed from the reference coordinates, the data values of the respective shafts stored in the present point storage section when the point P $(P_x,P_y)$ is indicated by the two attitudes are incorrect, and the values obtained by adding suitable correction values to such incorrect data values are the true data values representing the actual attitudes of the arms (arm angles). That is, the absolute values of the position data values of the point P are $\theta_{1a}+\Delta\theta_1$, $\theta_{2a}+\Delta\theta_2$ when expressed using the positional data $\theta_{1a}$, $\theta_{2a}$ with respect to the right-hand system attitude I, and therefore the absolute position of the position P can be expressed in orthogonal coordinates as follows:

$$\begin{bmatrix} P_X \\ P_Y \end{bmatrix} = \begin{bmatrix} \cos(\theta_{1a} + \Delta\theta_1) & \cos(\theta_{1a} + \Delta\theta_1 + \theta_{2a} + \Delta\theta_2) \\ \sin(\theta_{1a} + \Delta\theta_1) & \sin(\theta_{1a} + \Delta\theta_1 + \theta_{2a} + \Delta\theta_2) \end{bmatrix} \begin{bmatrix} l_1 \\ l_2 \end{bmatrix}, \quad (4)$$

where $P_X$ and $P_Y$ represent the X and Y coordinates of the absolute positions respectively, and $l_1$ and $l_2$ represent the lengths of the first and second arms 1 and 2, respectively.

Similar to this case, the absolute values of the positional data values of the fixed point P can be expressed as $\theta_{1b}+\Delta\theta_1$, $\theta_{2b}+\Delta\theta_2$ using the positional data values $\theta_{1b}$, $\theta_{2b}$ with respect to the left-hand system attitude II, and therefore the absolute position of the position P can be expressed in orthogonal coordinates as follows:

$$\begin{bmatrix} P_X \\ P_Y \end{bmatrix} = \begin{bmatrix} \cos(\theta_{1b} + \Delta\theta_1) & \cos(\theta_{1b} + \Delta\theta_1 + \theta_{2b} + \Delta\theta_2) \\ \sin(\theta_{1b} + \Delta\theta_1) & \sin(\theta_{1b} + \Delta\theta_1 + \theta_{2b} + \Delta\theta_2) \end{bmatrix} \begin{bmatrix} l_1 \\ l_2 \end{bmatrix} \quad (5)$$

The respective values of $P_X$ in equations (4) and (5) are equal, and the respective values of $P_Y$ in equations (4) and (5) are also equal. This is due to the fact that the point P is expressed in equations (4) and (5) in accordance with the right- and left-hand system attitudes I and II, and therefore the deviations $\Delta\theta_1$ and $\Delta\theta_2$ can be obtained from equations (4) and (5) because the positional data values $\theta_{1a}$, $\theta_{2a}$ and $\theta_{1b}$, $\theta_{2b}$ and the respective arm lengths $l_1$ and $l_2$ are known values.

That is, equations (4) and (5) can be rewritten as follows:

$$P = l_1 e^{j(\theta_{1a}+\Delta\theta_1)} + l_2 e^{j(\theta_{1a}+\Delta\theta_1+\theta_{2a}+\Delta\theta_2)}, \text{ and} \quad (4')$$

$$P = l_1 e^{j(\theta_{1b}+\Delta\theta_1)} + l_2 e^{j(\theta_{1b}+\Delta\theta_1+\theta_{2b}+\Delta\theta_2)}. \quad (5')$$

Since equations (4') and (5') are identical, $$l_1(e^{j(\theta_{1a}+\Delta\theta_1)} - e^{j(\theta_{1b}+\Delta\theta_1)})/ + \quad (6)$$
$$l_2(e^{j(\theta_{1a}+\Delta\theta_1+\theta_{2a}+\Delta\theta_2)} - e^{j(\theta_{1b}+\Delta\theta_1+\theta_{2b}+\Delta\theta_2)}) = 0.$$
$$\therefore e^{j\Delta\theta_1}[l_1(e^{j\theta_{1a}} - e^{j\theta_{1b}}) + l_2 e^{j\Delta\theta_2}(e^{j(\theta_{1a}+\theta_{2a})} - e^{j(\theta_{1b}+\theta_{2b})})] = 0.$$

Setting the expression inside of the brackets in equation (6) equal to 0, $$l_1(e^{j\theta_{1a}} - e^{j\theta_{1b}})/ + l_2 e^{j\Delta\theta_2}(e^{j(\theta_{1a}+\theta_{2a})} - e^{j(\theta_{1b}+\theta_{2b})}) = 0 \quad (7)$$

$$\therefore \frac{l_1}{l_2}(e^{j\theta_{1a}} - e^{j\theta_{1b}}) + e^{j\Delta\theta_2}(e^{j(\theta_{1a}+\theta_{2a})} - e^{j(\theta_{1b}+\theta_{2b})}) = 0.$$

Setting $\theta_A = \theta_{1a}+\theta_{2a}$, $\theta_B = \theta_{1b}+\theta_{2b}$, from equation (7), $$\frac{l_1}{l_2}(e^{j\theta_{1a}} - e^{j\theta_{1b}}) + e^{j\Delta\theta_2}(e^{j\theta_A} - e^{j\theta_B}) = 0 \quad (8)$$

$$\frac{l_1}{l_2}(\cos\theta_{1a} - \cos\theta_{1b}) + \cos\Delta\theta_2(\cos\theta_A - \cos\theta_B) - \quad (9)$$
$$\sin\Delta\theta_2(\sin\theta_A - \sin\theta_B) = 0$$

$$\frac{l_1}{l_2}(\sin\theta_{1a} - \sin\theta_{1b}) + \sin\Delta\theta_2(\cos\theta_A - \cos\theta_B) - \quad (10)$$
$$\cos\Delta\theta_2(\sin\theta_A - \sin\theta_B) = 0.$$

Setting
$\alpha = \cos\theta_A - \cos\theta_B$ $\beta = \sin\theta_A - \sin\theta_B$ $\gamma = \cos\theta_{1a} - \cos\theta_{1b}$ $\delta = \sin\theta_{1a} - \sin\theta_{1b}$,
from equation (9):

$$\alpha\cos\Delta\theta_2 + \beta\sin\Delta\theta_2 = \frac{l_1}{l_2} \cdot \gamma. \quad (11)$$

from equations (10):

$$\beta\cos\Delta\theta_2 + \alpha\sin\Delta\theta_2 = \frac{l_1}{l_2} \cdot \delta. \quad (12)$$

from equations (11) and (12):

$$\Delta\theta_2 = \tan^{-1}\left[\frac{-(\alpha\delta - \beta\gamma)}{-(\alpha\gamma + \beta\delta)}\right].$$

Assuming P falls on the Y axis of the robot, in order to determine the value of $\theta_1$, from equation (4'):

$$l_2 \sin(\theta_{1a}+\theta_{2a}+\Delta\theta_2+\Delta\theta_1) + l_1 \sin(\theta_{1a}+\Delta\theta_1) = 0 \quad (13)$$

From equation (13):

$$[l_1 + l_2\cos(\theta_{2a} + \Delta\theta_2)] \sin(\theta_{1a} + \Delta\theta_1) + \quad (14)$$
$$l_2\sin(\theta_{2a} + \Delta\theta_2)\cos(\theta_{1a} + \Delta\theta_1) = 0.$$

$$\therefore \tan(\theta_{1a} + \Delta\theta_1) = -\frac{l_2\sin(\theta_{2a} + \Delta\theta_2)}{l_1 + l_2\cos(\theta_{2a} + \Delta\theta_2)}.$$

Assuming the values $\theta_{1a}$, $\theta_{2a}$, $\theta_{1b}$, $\theta_{2b}$, $l_1$, and $l_2$ are known, the CPU 14 evaluates the following equations to thereby obtain the deviations:

$$\theta_A = \theta_{1a}+\theta_{2a}$$

$$\theta_B = \theta_{1b} + \theta_{2b}$$
$$\alpha = \cos\theta_A - \cos\theta_B$$
$$\beta = \sin\theta_A - \sin\theta_B$$
$$\gamma = \cos\theta_{1a} - \cos\theta_{1b}$$
$$\delta = \sin\theta_{1a} - \sin\theta_{1b},$$

$$\Delta\theta_2 + \tan^{-1}\left[\frac{-(\alpha\delta - \beta\gamma)}{-(\alpha\gamma - \beta\delta)}\right].$$

$$\Delta\theta_1 = -\tan^{-1}\left[\frac{l_2\sin(\theta_{2a} + \Delta\theta_2)}{l_1 + l_2\cos(\theta_{2a} + \Delta\theta_2)}\right] - \theta_{1a}.$$

Although the embodiment described above is arranged such that the inputting of positional data for the correcting operation is achieved using the record addition switch 17c, the record correction switch 17d, etc., the present invention is not limited to this arrangement, and an input device including, for instance a CRT, a keyboard and the like may be used instead of the teaching box. The order of the steps used for inputting the position data can be exchanged. Further, although the above description relates to an embodiment of a robot of the horizontal articulation type having two arms, the present invention is not limited to this type of robot, and it is a matter of course that the invention can be applied to a robot of the multi-articulation type having three or more arms.

As described above, according to the present invention, a robot control apparatus is additionally provided with a correction section in which the deviation of an actual position of an operational end of the robot from the stored position data therefor is computed and the stored position data is computed using the thus computed deviation, resulting in an effect that reference point adjustment for each arm upon the completion of assembly of the robot can be easily and accurately achieved without the use of an expensive jig. In any case, since the stored reference positional data is accurate, movement along a predetermined desired path is achived.

I claim:

1. An apparatus for controlling a robot having a plurality of arms of the multiarticulation type, comprising:
a main storage section for storing work point data and work procedure instructions for said robot;
a present point storage section for storing present angular position data of each of said plurality of arms of said robot;
a reference point storage section for storing reference angular position data for each of said plurality of arms of said robot when said robot is actuated;
a central processing unit for producing a signal for instructing said robot to effect predetermined operations on the basis of said work point data, said work procedure instructions, said present angular position data, and said reference angular position data; and
a correction section for determining an angular deviation of an actual position of each of said plurality of arms from angular positional data corresponding to a present angular position to thereby correct said stored angular positional data on the basis of the determined angular deviation, whereby correction of said stored angular positional data is achieved without use of additional physical structure.

2. The robot control apparatus according to claim 1, wherein said correction section comprises means for performing said determining on the basis of data indicative of the spatial positions corresponding to the attitudes of said plurality of arms.

3. The robot control apparatus according to claim 2, wherein said angular deviation is an angular deviation of an actual position of said robot arm when said robot arm has been returned to a reference position from a position corresponding to said reference angular position data.

4. The robot control apparatus according to claim 3, wherein said correction section corrects said reference angular position data.

5. The robot control apparatus according to claim 4, wherein correction by said correction section is performed before a work point of said robot is stored in said main storage section.

6. The robot control apparatus according to claim 1, wherein said correction section comprises a correction teaching box for issuing an instruction of correction procedures and a correction instructing section for instructing said central processing unit to determine said angular deviation on the basis of present angular position data and reference angular position data which change in accordance with a correction instruction from said correction teaching box so as to correct the stored angular position data.

7. The robot control apparatus according to claim 6, wherein said correction teaching box comprises a correction start switch, a JOG switch, a record addition switch, a record correction switch, and a record termination switch.

8. The robot control apparatus according to claim 7, wherein said JOG switch comprises a switch for instructing said robot to perform a manual operation.

9. The robot control apparatus according to claim 8, wherein said record addition switch instructs said central processing unit to input present value data indicative of a predetermined arm attitude in a predetermined spatial position.

10. The robot control apparatus according to claim 9, wherein said record correction switch instructs said central processing unit to input present value data indicative of arm attitude different from said predetermined arm attitude in a predetermined spatial position.

11. The robot control apparatus according to claim 1, wherein said robot is a two-arm horizontal articulation robot.

* * * * *